US008685551B2

(12) United States Patent
Koh et al.

(10) Patent No.: US 8,685,551 B2
(45) Date of Patent: Apr. 1, 2014

(54) BATTERY PACK

(75) Inventors: Seok Koh, Suwon-si (KR); Youngcheol Jang, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 982 days.

(21) Appl. No.: 12/533,355

(22) Filed: Jul. 31, 2009

(65) Prior Publication Data

US 2010/0136408 A1 Jun. 3, 2010

(30) Foreign Application Priority Data

Nov. 28, 2008 (KR) .......................... 10-2008-0119371

(51) Int. Cl.
*H01M 10/42* (2006.01)

(52) U.S. Cl.
USPC ............................................................ 429/7

(58) Field of Classification Search
USPC ....................................................... 429/122, 7
See application file for complete search history.

(56) References Cited

U.S. PATENT DOCUMENTS

2007/0160878 A1* 7/2007 Kim et al. .......................... 429/7
2008/0176131 A1* 7/2008 Byun et al. ..................... 429/122
2010/0310909 A1* 12/2010 Yun et al. ......................... 429/90

FOREIGN PATENT DOCUMENTS

| JP | 2002-231201 | 8/2002 |
| JP | 2007-207602 | 8/2007 |
| KR | 1020070033834 A | 3/2007 |
| KR | 100760784 B1 | 9/2007 |

* cited by examiner

*Primary Examiner* — Ula C Ruddock
*Assistant Examiner* — Frank Chernow
(74) *Attorney, Agent, or Firm* — Knobbe, Martens, Olson & Bear, LLP

(57) ABSTRACT

Disclosed is a battery pack that can secure the mounting space of a circuit device in a circuit module, can simplify the assembling process of a bare cell and a circuit module, and can miniaturize the battery by lowering the height between the bare cell and the circuit module. The battery pack includes: a bare cell having a protruding electrode terminal insulated from the top surface thereof; a circuit module disposed on the bare cell and electrically connected to the bare cell, the circuit module having an insert hole or an insert recess formed in a region corresponding to the electrode terminal; a first lead plate coupled to the electrode terminal and inserted into the insert hole or the insert recess; and a second lead plate coupled to one side of the circuit module and extending to be connected to the top surface of the bare cell.

8 Claims, 13 Drawing Sheets

BATTERY PACK

CROSS-REFERENCE TO RELATED APPLICATION

This application claims priority to and the benefit of Korean Patent Application No. 10-2008-0119371 filed on Nov. 28, 2008, the entire content of which is incorporated herein by reference.

BACKGROUND OF THE INVENTION

1. Field of the Invention

The present invention relates to a battery pack, and more particularly, to a battery pack that can secure the mounting space of a circuit device in a circuit module, can simplify the assembling process of a bare cell and a circuit module, and can miniaturize the battery by lowering the height between the bare cell and the circuit module.

2. Description of the Related Art

In general, as portable wireless devices such as video cameras, mobile phones, and portable computers become lighter and highly-functionalized, studies on secondary batteries used as drive sources of portable wireless devices are being widely carried out. Secondary batteries include nickel-cadmium batteries, nickel-hydrogen batteries, nickel-zinc batteries, and lithium secondary batteries. Of the secondary batteries, since lithium secondary batteries can be rechargeable and miniaturized and can have a high capacity, they are being generally used in high-tech electronic device fields due to their high operation voltages and energy densities per weight.

A lithium secondary battery has the form of a battery pack. The battery pack includes bare cell having an electrode assembly with a positive electrode plate, a negative electrode plate and a separator. The pack further includes a can accommodating the electrode assembly and a cap assembly sealing the top opening of the can. The pack further includes a circuit module having a circuit device, such as a charge/discharge device and a protection circuit device, which is coupled to the bare cell The pack also often includes and an outer cover covering the circuit module.

Typically, the bare cell and the circuit module are electrically connected to each other by a first lead plate and a second lead plate. However, since the first lead plate and the second lead plate are generally mounted to a surface of the circuit module, large spaces for mounting the first lead plate and the second lead plate are necessary. Accordingly, this limits the mounting of a plurality of circuit devices in or on the circuit module. Moreover, since the first lead plate and the second lead plate are mounted to a surface of the circuit module, the total length of the battery pack becomes longer, making it more difficult to miniaturize the battery pack.

In addition, since the first lead plate is generally located at a central portion of the top of the bare cell and the second lead plate is generally located on one side thereof, the circuit module disposed on the bare cell often cannot be horizontal. Accordingly, the circuit module is often deflected to one side of the battery pack and this makes the quality of the battery lowered.

BRIEF SUMMARY OF THE INVENTION

The present invention has been made in view of the above problems, and the present invention provides a battery pack that can secure the mounting space of a circuit device in a circuit module by inserting and coupling at least one of a first lead plate and a second lead plate into the circuit module, can simplify the assembling process of a bare cell and the circuit module, and can miniaturize the battery by lowering the height between the bare cell and the circuit module.

The present invention also provides a battery pack that can reduce lowering of the quality of the battery due to deflection of a circuit module by maintaining the circuit module disposed on a bare cell in a horizontal orientation using a dummy lead plate having the same shape as that of the second lead plate.

In accordance with an aspect of the present invention, there is provided a battery pack comprising: a bare cell having a protruding electrode terminal insulated from the top surface thereof; a circuit module disposed on the bare cell and electrically connected to the bare cell, the circuit module having an insert opening formed in a region corresponding to the electrode terminal; a first lead plate coupled to the electrode terminal and inserted into the insertopening; and a second lead plate coupled to one side of the circuit module and extending to be connected to the top surface of the bare cell.

The first lead plate may be made of a metal, and may include a bottom wall contacted with the electrode terminal, a side wall bent and extended from the bottom wall and having a side wall hole, the side wall being inserted into the insert opening, and a fixing protrusion extending and protruding from one side of the inner surface of the side wall hole toward the outside of the side wall.

The planar shape of the insert opening may be the same as that of the side wall of the first lead plate. The inner surface of the insert opening may be plated.

A solder interconnection may be formed between an end of the first lead plate and an upper portion of the insert hole. An upper portion of the insert hole may be larger than a lower portion thereof.

The second lead plate may be made of a metal, and may include a bottom wall contacted with one side of the bottom surface of the circuit module, a side wall bent and extended from the bottom wall, and an extension bent and extended from the side wall to make contact with the top surface of the bare cell and parallel to the bottom wall.

The battery pack may further comprise: a dummy lead plate coupled to the opposite side of the circuit module to be symmetrical with the second lead plate and connected to the top surface of the bare cell, the dummy lead plate having the same shape, size, and material as those of the second lead plate.

In accordance with another aspect of the present invention, there is provided a battery pack comprising: a bare cell having a protruding electrode terminal insulated from the top surface thereof; a circuit module disposed on the bare cell and electrically connected to the bare cell, the circuit module having a welding hole formed in a region corresponding to the electrode terminal and an insert opening on one side thereof; a first lead plate coupled to the bottom surface of the circuit module and extending to be connected to the electrode terminal; and a second lead plate coupled to one side of the top surface of the bare cell and inserted into the insert hole or the insert recess.

The first lead plate may be made of a metal, and may include a bottom wall contacted with the bottom surface of the circuit module, a side wall bent and extended from the bottom wall, and an extension bent and extended from the side wall to make contact with the electrode terminal and parallel to the bottom wall.

The extension of the first lead plate may be welded to the electrode terminal by welding through the welding hole.

The second lead plate may be made of a metal, and may include a bottom wall contacted with one side of the top surface of the bare cell, a side wall having a first side wall portion having the same width as the bottom wall and bent and extended from the bottom wall, a second side wall portion having a width narrower than that of the first side wall portion, connected to the first side wall portion, and inserted into the insert opening, and a side wall hole formed in the second side wall portion, a fixing protrusion extending and protruding from one side of the inner surface of the side wall hole toward the outside of the side wall, and a support extending from facing edges of the bottom wall in the same direction as the side wall and having a height the same as the first side wall portion of the side wall.

The planar shape of the insert opening may be the same as that of the second side wall portion of the side wall of the second lead plate. The inner surface of the insert hole or the insert recess may be plated.

A solder may be formed between an end of the second lead plate and an upper portion of the insert hole. An upper portion of the insert hole may be larger that a lower portion thereof.

The battery pack may further comprise: a dummy lead plate coupled to the opposite side of the top surface of the bare cell to be symmetrical with the second lead plate and inserted into an insert hole or an insert recess formed on the opposite side of the circuit module, the dummy lead plate having the same shape, size, and material as those of the second lead plate.

In accordance with still another aspect of the present invention, there is provided a battery pack comprising: a bare cell having a protruding electrode terminal insulated from the top surface thereof; a circuit module disposed on the bare cell and electrically connected to the bare cell, the circuit module having insert openings formed in a region corresponding to the electrode terminal and on one side thereof; a first lead plate coupled to the electrode terminal and inserted into the insert opening formed in the region corresponding to the electrode terminal; and a second lead plate coupled to one side of the top surface of the bare cell and inserted into the insert hole or the insert recess formed on one side of the circuit module.

Solders may be formed between an end of the first lead plate and the insert hole and between an end of the second lead plate and the insert hole.

The battery pack may further comprise: a dummy lead plate coupled to the opposite side of the top surface of the bare cell to be symmetrical with the second lead plate and inserted into an insert opening formed on the opposite side of the circuit module, the dummy lead plate having the same shape, size, and material as those of the second lead plate.

The battery pack according to the present invention can secure the mounting space of a circuit device in a circuit module by inserting and coupling at least one of a first lead plate and a second lead plate into the circuit module, can simplify the assembling process of a bare cell and the circuit module, and can miniaturize the battery by lowering the height between the bare cell and the circuit module.

Furthermore, the battery pack according to the present invention can prevent lowering of the quality of the battery due to deflection of a circuit module by maintaining the horizontality of the circuit module disposed on a bare cell using a dummy lead plate having the same shape as that of the second lead plate.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Hereinafter, exemplary embodiments of the present invention will be described in detail with reference to the accompanying drawings.

Figure 1A:
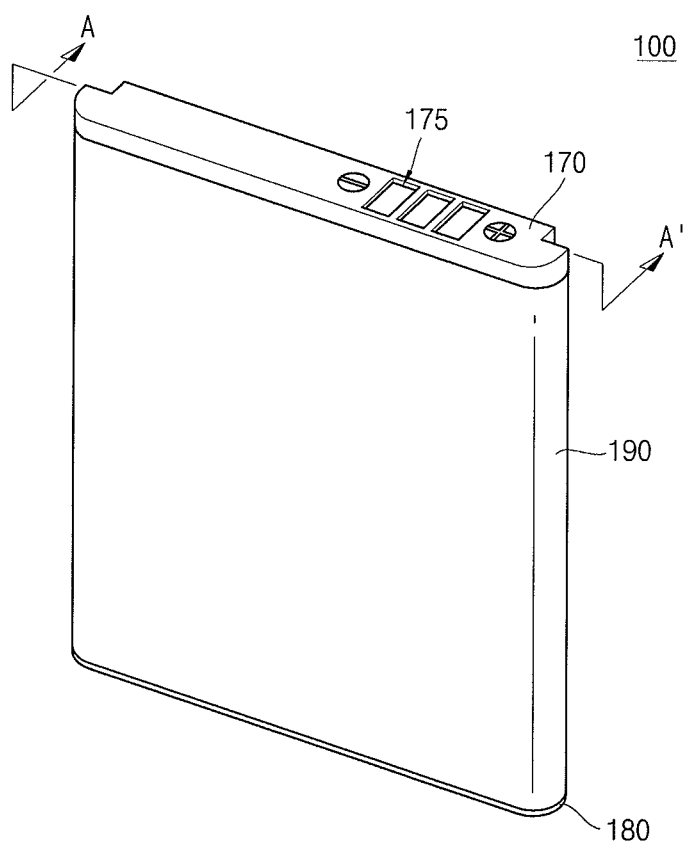
FIG. 1A is a perspective view of a finished battery pack according to an embodiment of the present invention.
Figure 1B:
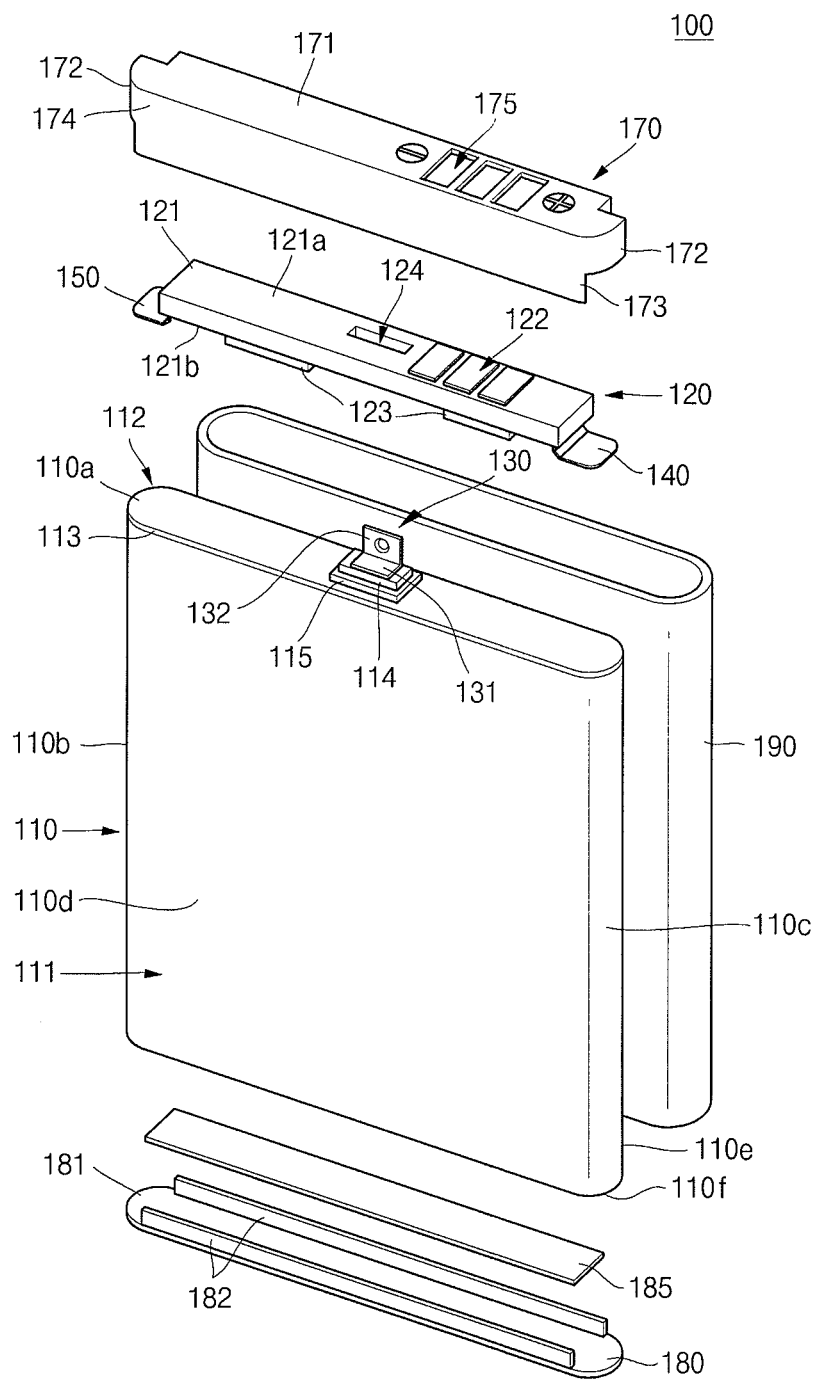
FIG. 1B is an exploded perspective view of the battery pack of FIG. 1A.
Figure 1C:
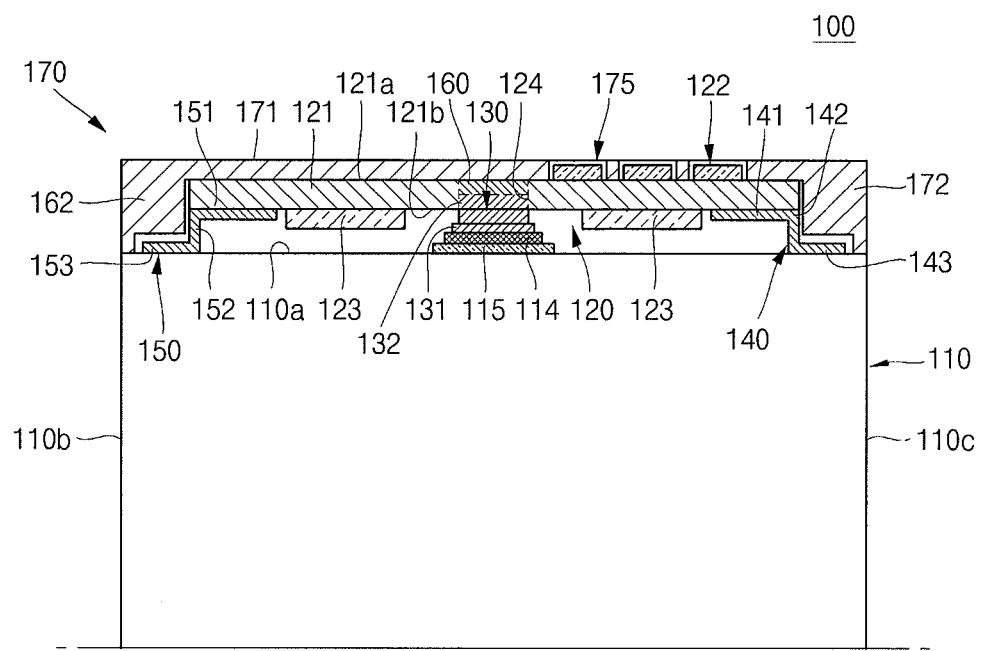
FIG. 1C is a sectional view of the battery pack of FIG. 1A taken along line A-A' of FIG. 1A.
Figure 2:
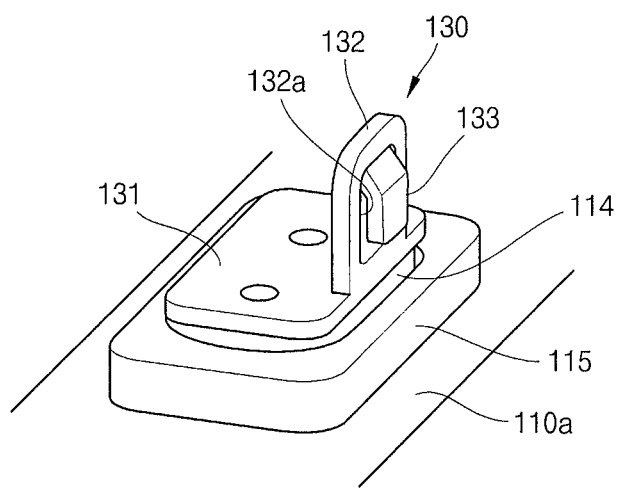
FIG. 2 is a perspective view illustrating a first lead plate of the battery pack of FIG. 1B from another angle.
Figure 3A:
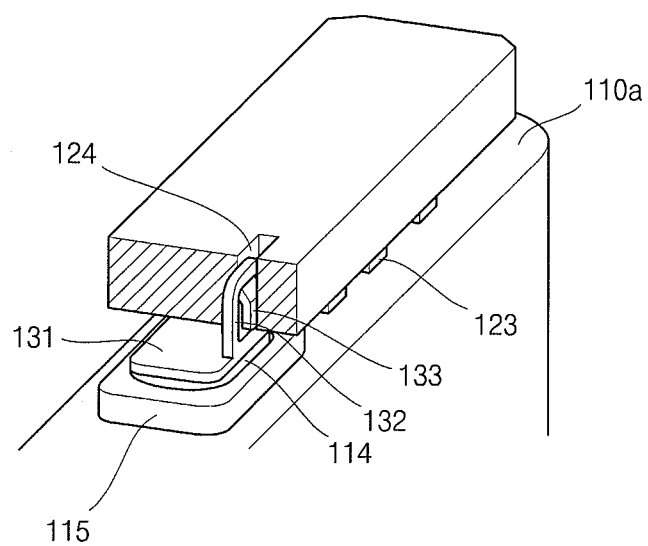
FIG. 3A is a partially cutaway perspective view illustrating the coupling relation between the first lead plate and a circuit module in the battery pack of FIG. 1C.
Figure 3B:
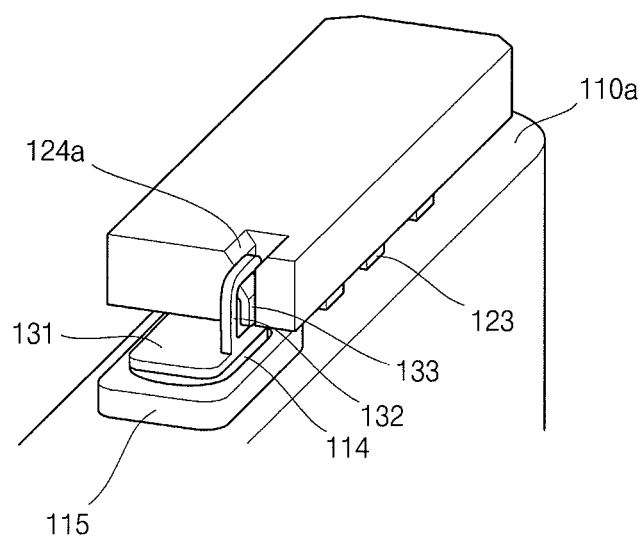
FIG. 3B is a perspective view illustrating another type of an insert hole illustrated in FIG. 3A.
Figure 4:
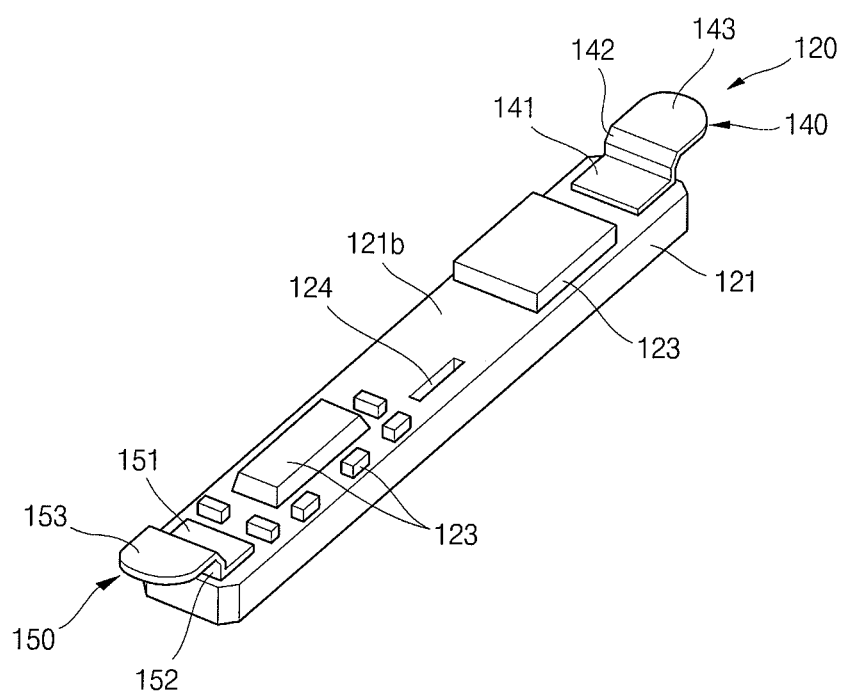
FIG. 4 is a perspective view illustrating the bottom of the circuit module of the battery pack illustrated in FIG. 1B.

FIG. 1A is a perspective view of a finished battery pack according to an embodiment of the present invention. FIG. 1B is an exploded perspective view of the battery pack of FIG. 1A. FIG. 1C is a sectional view of the battery pack of FIG. 1A taken along line A-A' of FIG. 1A. FIG. 2 is a perspective view illustrating a first lead plate of the battery pack of FIG. 1B from another angle. FIG. 3A is a partially cutaway perspective view illustrating the coupling relation between the first lead plate and a circuit module in the battery pack of FIG. 1C. FIG. 3B is a perspective view illustrating another type of an insert hole illustrated in FIG. 3A. FIG. 4 is a perspective view illustrating the bottom of the circuit module of the battery pack illustrated in FIG. 1B.

Referring to FIGS. 1A to 1C, the battery pack 100 according to the embodiment of the present invention includes a bare cell 110, a circuit module 120, a first lead plate 130, a second lead plate 140, a dummy lead plate 150, a solder 160, a top cover 170, a bottom cover 180, and a label 190.

The bare cell 110 and the circuit module 120 are electrically connected to each other through the first lead plate 130 and the second lead plate 140, forming a core pack, and after the top cover 170 and the bottom cover 180 are assembled in the core pack, the label 190 is attached to the core pack to finish the battery pack 100.

The bare cell 110 includes an electrode assembly (not shown) having a positive electrode, a negative electrode, and a separator interposed between the positive electrode and the negative electrode to supply electrical energy; a can 111 made of a metal and accommodating the electrode assembly and an electrolyte (not shown); and a cap assembly 112 sealing an opening of the can 111. Here, the cap assembly 112 includes a cap plate 113 made of a metal, an electrode terminal 114 protruding over the cap plate 113, and a gasket 115 interposed between the cap plate 113 and the electrode terminal 114 to insulate the electrode terminal 114 from the cap plate 113.

The can 111 and the cap plate 113 themselves may function as a terminal, and in the embodiment of the present invention, they are assumed to function as a positive electrode. In this case, the terminal plate 114 is assumed to function as a negative electrode. It is apparent that the can 111, the cap plate 113, and the electrode terminal 114 may have different polarities.

As illustrated in FIG. 1B, the outer appearance of the bare cell 110 has a top surface 110a over which the electrode terminal 114 protrudes with the electrode terminal 114 being insulated by the gasket 115, a pair of narrow side surfaces 110b and 110c and a pair of wide side surfaces 110d and 110e connected to the top surface 110a, and a bottom surface 110f connected to the side surfaces 110b, 110c, 110d, and 110e and being opposite to the top surface 110a. Here, the narrow side surfaces 110b and 110c are side surfaces whose widths are narrow, and the wide side surfaces 110d and 110e are side surfaces whose widths are wide. The side surfaces 110b, 110c, 110d, and 110e are connected to the top surface 110a of the bare cell 110.

The circuit module 120 is disposed on the bare cell 110 and electrically connected to the bare cell 110, and includes a circuit board 121, external terminals 122, and an insert opening, such as an insert hole, 124.

The circuit board 121 is a plate made of a resin, and includes a protective circuit such as a circuit (not shown) making the charge state of the battery more uniform by controlling charge and discharge of the battery or a circuit preventing overdischarge or overcharge of the battery. The circuit board 121 includes a charge/discharge circuit (not shown) and a circuit device 123 for realizing the protective circuit (not shown) on the bottom surface 121b. Meanwhile, it is assumed that the top surface 121a of the circuit board 121 is the same as the top surface of the circuit module 120 and the bottom surface 121b of the circuit board 121 is the same as the bottom surface of the circuit module 120.

The external terminals 122 are installed on the top surface 121a of the circuit board 121, and electrically connect the circuit board 121 to an external electronic device (not shown).

The insert hole 124 passes through the top surface 121a and the bottom surface 121b of the circuit board 121 and is located in a region corresponding to the electrode terminal 114 of the bare cell 110. The insert hole 124 is a space through which the first lead plate 130 is inserted, and the circuit module 120 and the bare cell 110 are physically connected through coupling the first lead plate 130 to the insert hole 124. The insert hole 124 has a plated inner surface to electrically connect the circuit module 120 and the bare cell 110 through the coupling of the lead plate 130 and the insert hole 124. Although the insert opening comprises the insert hole 124 that is formed as the space through which the first lead plate 130 is inserted in the embodiment of the present invention, the insert opening can also comprise an insert recess (not shown) recessed from the bottom surface 121b of the circuit board 121 and having a plated inner surface may be formed instead of the insert hole 124.

The first lead plate 130 is coupled to the top of the electrode terminal 114, and is press-fitted into the insert hole 124 of the circuit module 120 to be electrically connected to a negative electrode wire pattern (not shown) of the circuit module 120. Hence, the first lead plate 130 electrically connects the bare cell 110 and the circuit module 120 to each other. The first lead plate 130 may be made of a metal such as a nickel or a nickel alloy. Here, the first lead plate 130 is connected to the electrode terminal 114 to function as a negative electrode like the electrode terminal 114.

More particularly, referring to FIG. 2, the lead plate 130 includes a bottom wall 131, a side wall 132, and a fixing protrusion 133.

The bottom wall 131 has a plate-like shape and makes contact with the electrode terminal 114. The bottom wall 131 is electrically connected to the electrode terminal 114, for example, by laser welding.

The side wall 132 is bent from the bottom wall 131 and extends toward the bottom surface 121b of the circuit board 121. A portion of the side wall 132 is inserted into the insert hole 124. Here, the side wall 132 has a side hole 132a to secure a space for forming the fixing protrusion 133.

The fixing protrusion 133 extends and protrudes from one side of the inner surface of the side hole 132a toward the outer side of the side wall 132. The fixing protrusion 133 is inserted into the insert hole 124 together when a portion of the side wall 132 is inserted into the insert hole 124, to fix the side wall 132 to the insert hole 124 using a resilient force.

Hereinafter, the coupling relation between the first lead plate 130 and the circuit module 120 will be described.

As illustrated in FIG. 3A, the first lead plate 130 is physically coupled and electrically connected to the circuit module 120 when a portion of the side wall 132 is press-fitted into the insert hole 124 by the fixing protrusion 133. Hence, as compared with the case in which a first lead plate is conventionally mounted to the bottom surface of the circuit module, the assembling process of the first lead plate 130 and the circuit module 120 is simplified and the battery can be miniaturized by lowering the height between the bare cell 110 and the circuit module 120. Here, the insert hole 124 has the same planar shape as that of the side wall 132 of the first lead plate 130 and has a size by which the side wall 132 of the first lead plate 130 can be inserted into the insert hole 124. Since the insert hole 124 is smaller than a welding hole conventionally formed in a circuit module to weld the bottom of a first lead plate to an electrode terminal by resistance welding, the mounting space of the circuit device may be secured further in the circuit module 120.

The second lead plate 140 is coupled to one side of the circuit module 120 and is electrically connected to a positive electrode wire pattern (not shown) of the circuit module 120. The second lead plate 140 extends to the top surface 110a of the bare cell 110 to electrically connect the bare cell 110 and the circuit module 120 to each other. The second lead plate 140 may be made of a metal such as nickel or a nickel alloy. Here, the second lead plate 140 is connected to the top surface 110a (i.e. the cap plate 113 functioning as a positive electrode) of the bare cell 110 to function as a positive electrode.

More particularly, referring to FIG. 4, the second lead plate 140 has a bottom wall 141, a side wall 142, and an extension 143.

The bottom wall 141 has a plate-like shape and makes contact with one side of the bottom surface 121b of the circuit board 121. The bottom wall 141 is electrically connected to the circuit module 120, for example, by laser welding.

The side wall 142 is bent from the bottom wall 141 and extends toward the top surface 110a of the bare cell 110, to secure the interval between the circuit module 120 and the bare cell 110.

The extension 143 is bent and extended from the side wall 142 to make contact with the top surface 110a of the bare cell 110, and is formed in parallel to the bottom wall 141. The extension 143 is electrically connected to the top surface 110a of the bare cell 110, for example, by laser welding.

The dummy lead plate 150 is coupled to the opposite side of the circuit module 120 provided as the mounting space of the circuit device 123 is secured, to be symmetrical with the second lead plate 140, and is electrically connected to the positive electrode wire pattern (not shown) of the circuit module 120. The dummy lead plate 150 is connected to and extended from the top surface 110a of the bare cell 110 to electrically connect the bare cell 110 and the circuit module 120 to each other. The dummy lead plate 150 has the same shape, size, and material as those of the second lead plate 140, and has a bottom wall 151, a side wall 152, and an extension 153. Referring to FIG. 4, since the bottom wall 151, the side wall 152, and the extension 153 of the dummy lead plate 150 correspond to the bottom wall 141, the side wall 142, and the extension 143 of the second lead plate 140, a detailed description of the dummy lead plate 150 will be omitted.

The dummy lead plate 150 maintains the horizontality of the circuit module 120 disposed on the bare cell 110 together with the second lead plate 140. Hence, the dummy lead plate 150 can reduce lowering of the battery quality due to deflection of the circuit module that would be generated if a second lead plate were conventionally formed only on one side of the circuit module and welded to the top surface of the bare cell by laser welding.

Referring to FIG. 1C, the solder 160 is formed between an end of the first lead plate 130, i.e. an end of the side wall 132 and the insert hole 124 to increase the coupling strength between the first lead plate 130 and the circuit module 120. Meanwhile, as more solder 160 is filled in the insert hole 124, the coupling strength between the first lead plate 130 and the circuit module 120 increases. To achieve this, as illustrated in FIG. 3B, an insert hole 124a whose upper portion is larger than its lower portion may be formed in the circuit module 120 instead of the insert hole 124.

The top cover 170 is coupled to the top of the bare cell 110. The circuit module 120 is accommodated in the interior space of the top cover 170. The top cover 170 includes a cover plate 171, and a side wall 174 extending from the cover plate 171 toward the circuit module 120.

The cover plate 171 has a shape substantially similar to that of the top surface of the bare cell 110. The inner surface of the cover plate 171 faces and makes contact with the top surface 121a of the circuit board 121. The cover plate 171 has a through-hole 175 formed in a region corresponding to the external terminal 122. The external terminal 122 is exposed to the outside through the through-hole 175 to electrically connect the battery pack 100 to an external electronic device (not shown).

The side wall 174 has end portions 172 located at opposite lengthwise ends of the top cover 170 and a connecting portion 173 connecting the end portions 172 to each other. The end portions 172 of the side wall 174 make contact with regions corresponding to the narrow side surfaces 110b and 110c of the bare cell 110 in the top surface 110a of the bare cell 110 and support the top cover 170. The connecting portion 173 extends toward the circuit module 120 further than the end portions 172. A portion of the connecting portion 173 that covers the top of the wide side surfaces 110d and 110e of the bare cell 110 is wrapped by the label 190.

The bottom cover 180 is coupled to the bottom of the bare cell 110. The bottom cover 180 has a bottom plate 181 and extensions 182 extending from the bottom plate 181 toward the bare cell 110.

The bottom plate 181 has substantially the same shape as that of the bottom surface 110f of the bare cell 110 and is attached to the bottom surface 110f of the bare cell 110 by a bonding member 185.

The extensions 182 cover lower portions of the wide side surfaces 110d and 110e of the bare cell 110. The extensions 182 are wrapped by the label 190.

The label 190 wraps the side surfaces 110b, 110c, 110d, and 110e of the bare cell 110. The label 190 covers a portion of the connecting portion 173 of the top cover 170 and the extensions 182 of the bottom cover 180.

As mentioned above, in the battery pack 100 according to the embodiment of the present invention, the circuit module 120 can be physically and electrically connected to the bare cell 110 by inserting the first lead plate 130 into the insert hole 124 having the size enabling insertion of the side wall 132 of the first lead plate 130.

Accordingly, the battery pack 100 according to the embodiment of the present invention can secure a wider mounting space for the circuit device 123 in the circuit module 120 as compared with the case in which a welding hole having the size corresponding to the bottom of a first lead plate is conventionally formed to weld an electrode terminal to the bottom of the first lead plate by resistance welding.

Moreover, the battery pack 100 according to the embodiment of the present invention can simplify the assembling process of the bare cell 110 and the circuit module 120 as compared with the case in which a first lead plate is conventionally mounted to a surface of a circuit module and can miniaturize the battery by lowering the height between the bare cell 110 and the circuit module 120.

In addition, the battery pack 100 according to the embodiment of the present invention can couple the dummy lead plate 150 to the opposite side of the circuit module 120 provided as the mounting space of the circuit device 123 is secured so that the dummy lead plate 150 is more symmetrical with the second lead plate 140.

Accordingly, the battery pack 100 according to the embodiment of the present invention can maintain the horizontality of the circuit module 120 disposed on the bare cell 110 using the second lead plate 140 and the dummy plate 150. Therefore, the battery pack 100 according to the embodiment of the present invention can prevent lowering of the battery quality due to deflection of the circuit module that would be generated if only a second lead plate was conventionally formed on one side of the circuit module and welded to the top surface of the bare cell by laser welding.

Hereinafter, a battery pack 200 according to another embodiment of the present invention will be described in detail.

The battery pack 200 according to the embodiment of the present invention has the same structure as that of the battery pack 100 according to the first mentioned embodiment of the present invention except for a circuit module 220, a first lead plate 230, a second lead plate 240, a dummy lead plate 250, and a solder 260. Accordingly, the same elements are endowed with the same reference numerals and the description of the same elements will be omitted. Hereinafter, the structures of the circuit module 220, the first lead plate 230, the second lead plate 240, the dummy lead plate 250, and the solder 260 will be mainly described in detail.

Figure 5A:
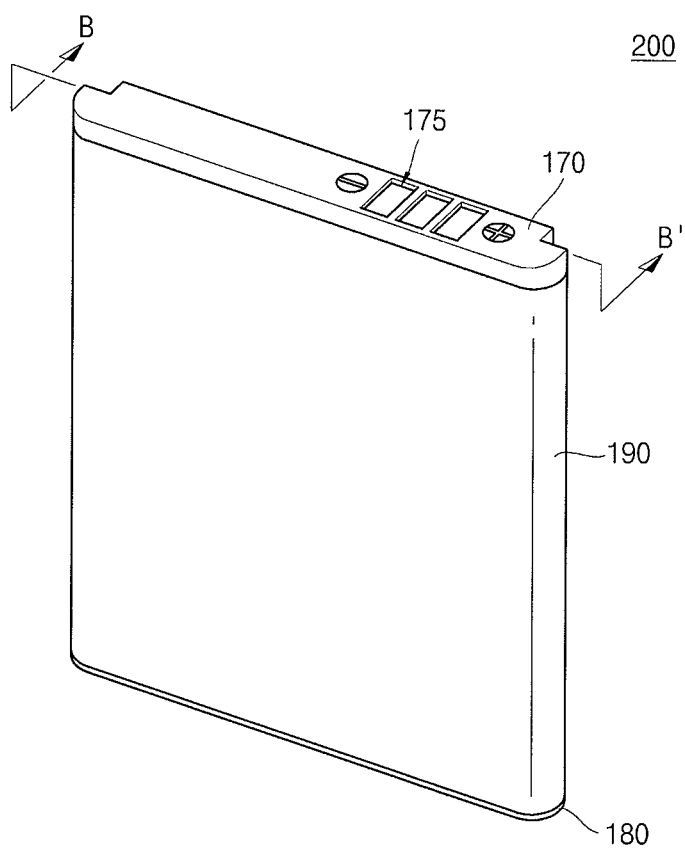
FIG. 5A is a perspective view of a finished battery pack according to another embodiment of the present invention.
Figure 5B:
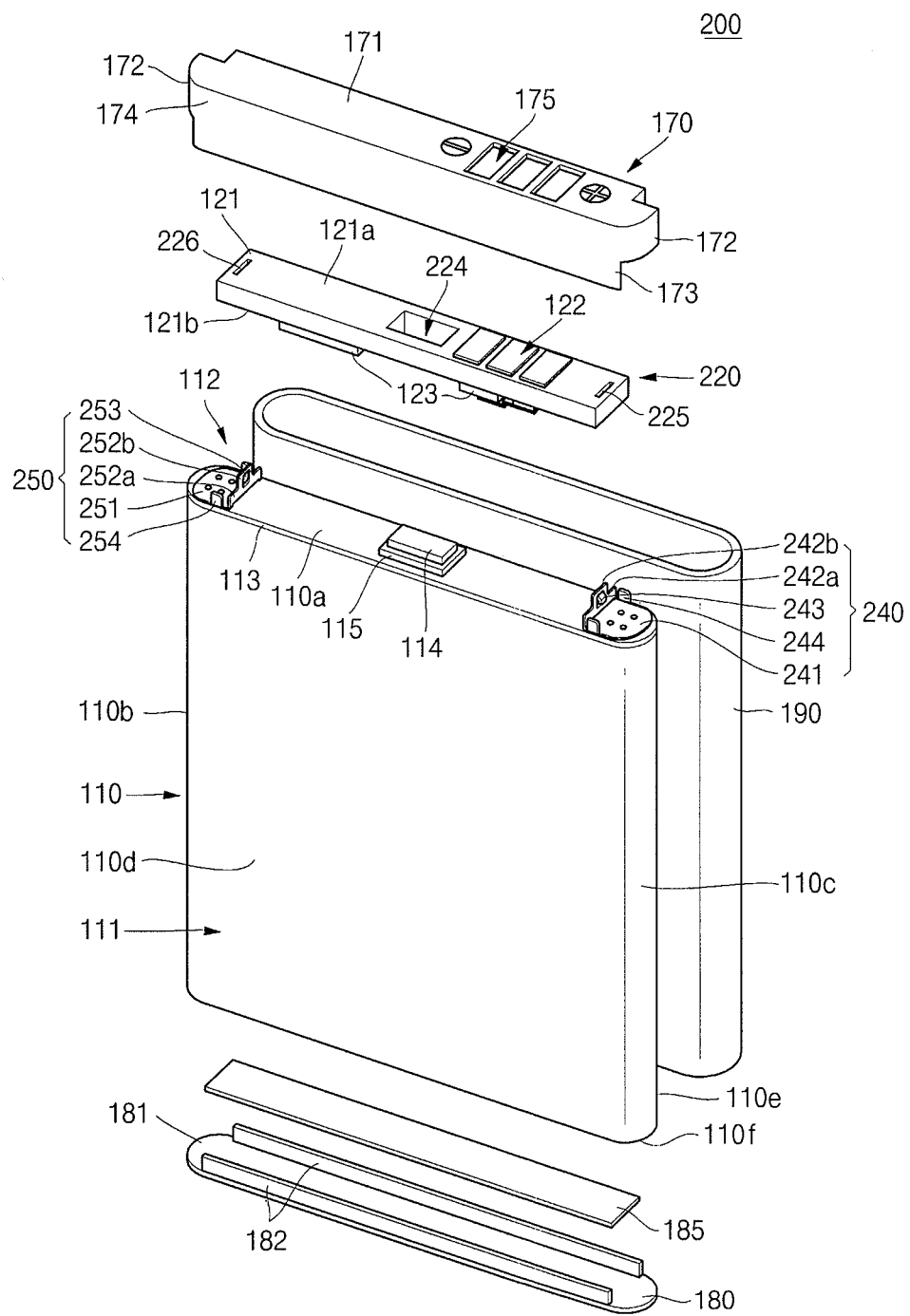
FIG. 5B is an exploded perspective view of the battery pack of FIG. 5A.
Figure 5C:
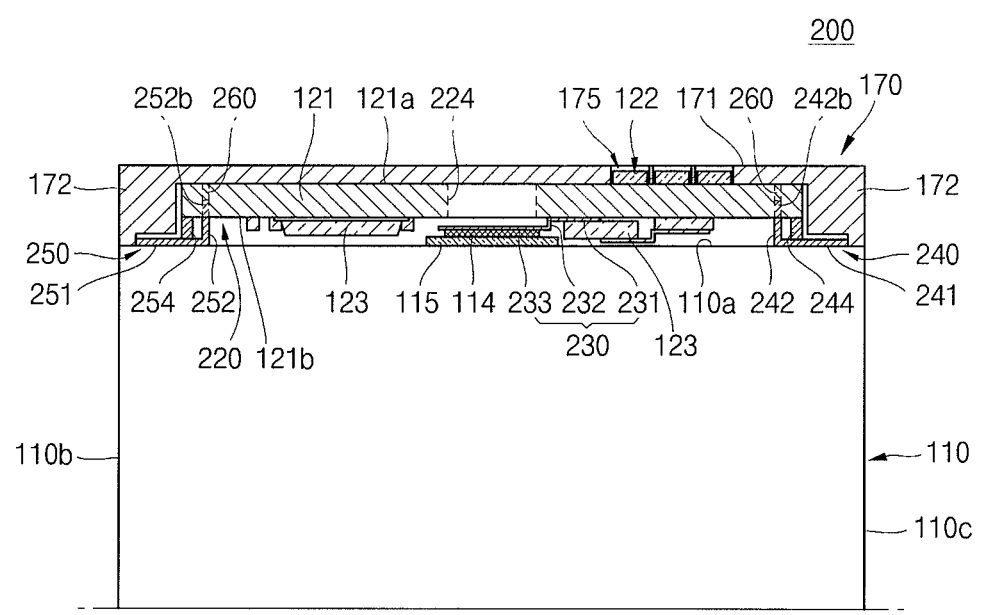
FIG. 5C is a sectional view of the battery pack of FIG. 5A taken along line B-B' of FIG. 5A.
Figure 6:
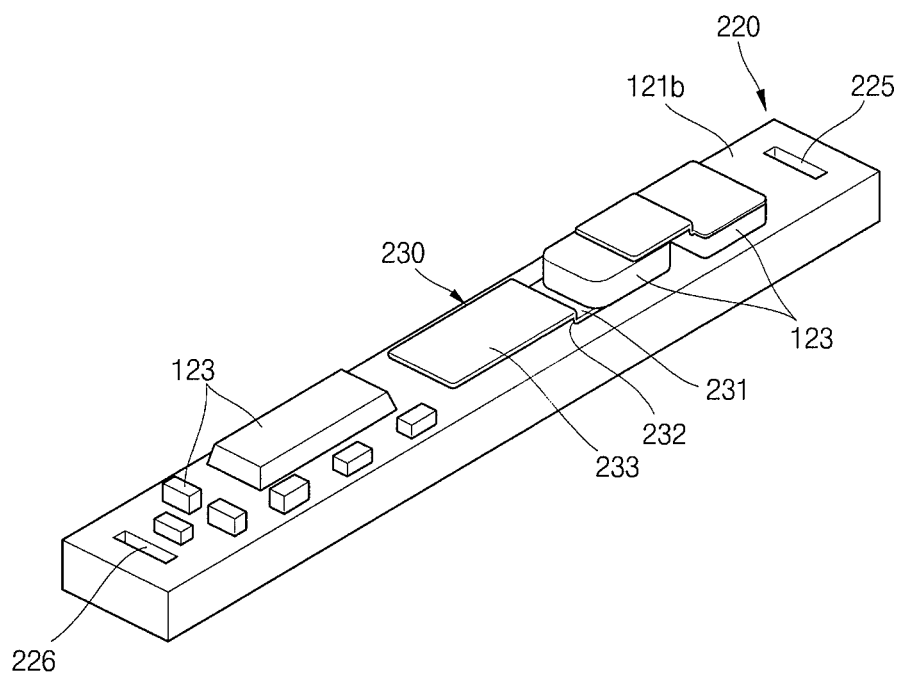
FIG. 6 is a perspective view illustrating the bottom of the circuit module of the battery pack illustrated in FIG. 5B.
Figure 7:
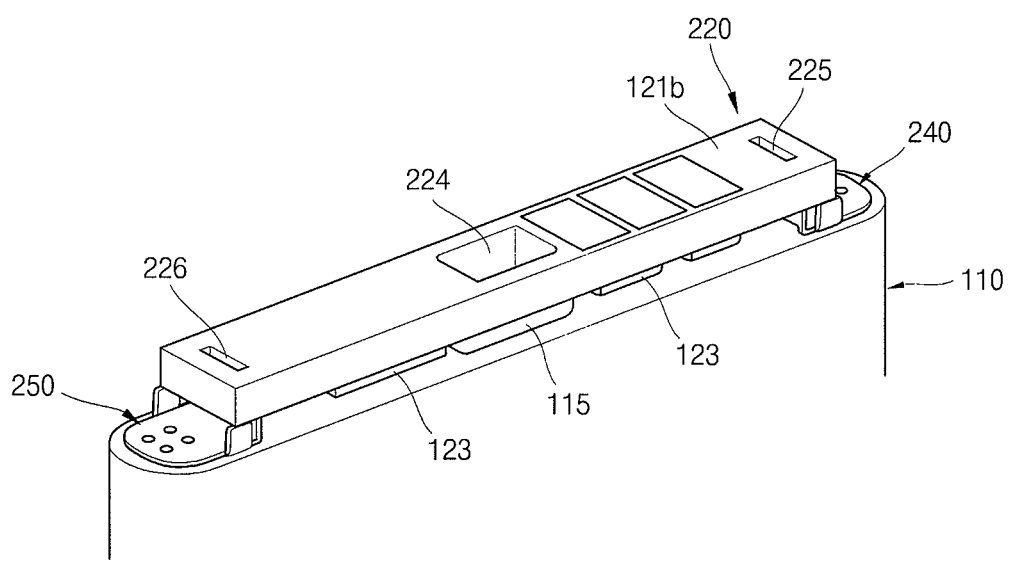
FIG. 7 is a perspective view of a bare cell and the circuit module of the battery pack illustrated in FIG. 5B.
Figure 8:
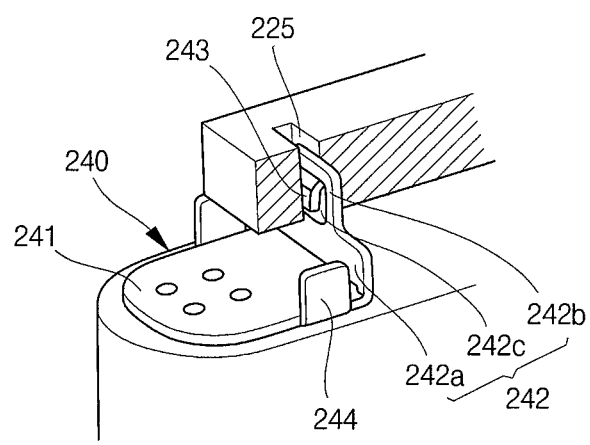
FIG. 8 is a partially cutaway perspective view illustrating the coupling relation between the circuit module and a second lead plate of FIG. 7 from another angle.
Figure 9:
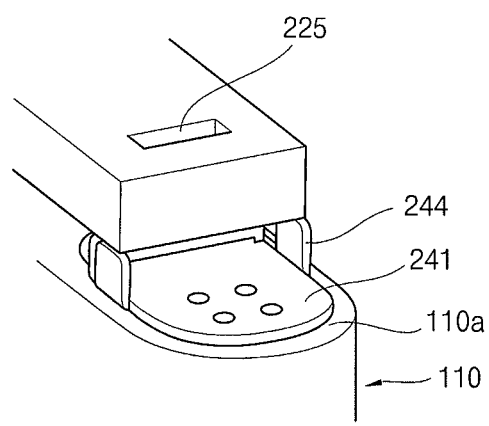
FIG. 9 is a partially cutaway perspective view illustrating the coupling relation between the circuit module and the second lead plate of FIG. 7 from still another angle.

FIG. 5A is a perspective view of a finished battery pack according to another embodiment of the present invention. FIG. 5B is an exploded perspective view of the battery pack of FIG. 5A. FIG. 5C is a sectional view of the battery pack of FIG. 5A taken along line B-B' of FIG. 5A. FIG. 6 is a perspective view illustrating the bottom of the circuit module of the battery pack illustrated in FIG. 5B. FIG. 7 is a perspective view of a bare cell and the circuit module of the battery pack illustrated in FIG. 5B. FIG. 8 is a partially cutaway perspective view illustrating the coupling relation between the circuit module and a second lead plate of FIG. 7 from another angle. FIG. 9 is a partially cutaway perspective view illustrating the coupling relation between the circuit module and the second lead plate of FIG. 7 from still another angle;

Referring to FIGS. 5A to 5C, the battery pack 200 according to the embodiment of the present invention includes a bare cell 110, a circuit module 220, a first lead plate 230, a second lead plate 240, a dummy lead plate 250, a solder 260, a top cover 170, a bottom cover 180, and a label 190.

The circuit module 220 is disposed on the bare cell 110 to be electrically connected to the bare cell 110, and includes a circuit board 121, external terminals 122, a welding hole 224, and insert openings, such as holes 225 and 226.

The welding hole 224 passes through the top surface 121a and the bottom surface 121b of the circuit board 121. The welding hole 224 is located in a region corresponding to the electrode terminal 114 of the bare cell 110 and provides a welding space when the first lead plate 230 is welded to an electrode terminal 114 of the bare cell 110 by resistance welding.

The insert holes 225 and 226 pass through the top surface 121a and the bottom surface 121b of the circuit board 121. The insert hole 225 is located on one side of the circuit module 220 and the insert hole 226 is located on the opposite side of the circuit module 220. The insert holes 225 and 226 are the spaces through which the second lead plate 240 and the dummy plate 250 are inserted respectively, and the circuit module 220 and the bare cell 110 are physically connected to each other through coupling of the second lead plate 240 and the dummy lead plate 250. The insert holes 225 and 226 have plated inner surfaces to electrically connect the circuit module 220 to the bare cell 110 through coupling of the second lead plate 240 and the dummy lead plate 250. Although the insert openings are comprised of holes 225 and 226 that are formed at the spaces through which the second lead plate 240 and the dummy lead plate 250 in the embodiment of the present invention pass, the insert openings can also comprise recesses (not shown) recessed from the bottom surface 121b of the circuit board 121 and having plated inner surfaces may be formed instead of the insert holes 225 and 226 without departing from the present invention.

The first lead plate 230 is installed on the bottom surface 121b of the circuit board 121 to be electrically connected to a negative wire pattern (not shown) of the circuit module 220, and is electrically connected to the electrode terminal 114 by resistance welding through the welding hole 224. The first lead plate 230 is made of a metal such as nickel or a nickel alloy. Here, the first lead plate 230 is connected to the electrode terminal 114 to function as a negative electrode like the electrode terminal 114.

More particularly, referring to FIGS. 5C and 6, the first lead plate 230 has a bottom wall 231, a side wall 232, and an extension 233.

The bottom wall 231 makes contact with the bottom surface 121b of the circuit board 121 around the welding hole 224, and is electrically connected to a peripheral circuit device 123, e.g. a PTC (positive temperature coefficient) device.

The side wall 232 is bent from the bottom wall 231 and extends toward the bare cell 110.

The extension 233 is bent and extended from the side wall 232 to make contact with the electrode terminal 114 and is parallel to the bottom wall 231. The extension 233 is located at a position corresponding to the welding hole 224, and is substantially welded to the electrode terminal 114 by resistance welding through the welding hole 224.

The second lead plate 240 is installed on one side of the top surface 110a of the bare cell 110, and is press-fitted into the insert hole 225 of the circuit module 220 and electrically connected to a positive wire pattern (not shown) of the circuit module 220. Hence, the second lead plate 240 electrically connects the circuit module 220 to the bare cell 110. The second lead plate 240 is made of a metal such as nickel or a nickel alloy. Here, the second lead plate 240 is connected to the top surface 110a (i.e. the cap plate 113 functioning as a positive electrode) of the bare cell 110 to function as a positive electrode.

More particularly, referring to FIGS. 5B and 5C, the second lead plate 240 has a bottom wall 241, a side wall 242, a fixing protrusion 243, and supports 244.

The bottom wall 241 has a plate-like shape and makes contact with the top surface 110a of the bare cell 110. The bottom wall 241 is electrically connected to the top surface 110a of the bare cell 110, for example, by laser welding.

The side wall 242 is bent from the bottom wall 241 and extends toward the bottom surface 121b of the circuit board 121. A portion of the side wall 242 is inserted into the insert hole 225. Referring to FIG. 8, the side wall 242 has a first side wall portion 242a, a second side wall portion 242b, and a side wall hole 242c.

The first side wall portion 242a is connected to the bottom wall 241 and has the same width as that of the bottom wall 241.

The second side wall portion 242b is connected to the first side wall portion 242a and has a width narrower than that of the first side wall portion 242a. This is because the mounting space of the circuit device 123 can be widened by reducing the size of the insert hole 225 in the circuit module 220.

The side wall hole 242c is formed in the second side wall 242b to provide a space for forming a fixing protrusion 243.

The fixing protrusion 243 extends and protrudes from one side of the inner surface of the side wall hole 242c toward the outside of the side wall 242. The fixing protrusion 243 is inserted into the insert hole 225 together when the second side wall 242b is inserted into the insert hole 225, to fix the second side wall portion 242b to the insert hole 225 using a resilient force.

The supports 244 extend from facing edges of the bottom wall 241 in the same direction as the side wall 242 and have the same height as the first side wall portion 242a of the side wall 242. The supports 244 support the circuit module together with the first side wall portion 242a of the side wall 242 to prevent deflection of the circuit module 220 due to an external force.

Hereinafter, the coupling relation between the second lead plate 240 and the circuit module 220 will be described.

As illustrated in FIGS. 7 to 9, the second lead plate 240 is physically coupled to the circuit module 220 by press-fitting the second side wall portion 242b of the side wall 242 into the insert hole 225 through the fixing protrusion 243, and is electrically connected to the circuit module 220. Hence, as compared with the case in which a second lead plate is conventionally mounted to the bottom surface of the circuit module, the assembling process of the first lead plate 130 and the circuit module 220 is simplified and the battery can be miniaturized by lowering the height between the bare cell 110 and the circuit module 220. Here, the insert hole 225 has the same planar shape as that of the second side wall portion 242b of the side wall 242 of the second lead plate 240 and has a size by which the second side wall portion 242b of the side wall 242 of the second lead plate 240 can be inserted into the insert hole 225. Since the insert hole 225 is smaller than a space necessary to conventionally mount a second lead plate, the mounting space of the circuit device 123 may be secured further in the circuit module 220.

The dummy lead plate 250 is coupled to the opposite side of the circuit module 220 provided as the mounting space of the circuit device 123 is secured, to be symmetrical with the second lead plate 240, and is press-fitted into the insert hole 226 of the circuit module 220 and electrically connected to the positive electrode wire pattern (not shown) of the circuit module 220. Hence, the dummy lead plate 250 electrically connects the circuit module 220 to the bare cell 110. The dummy lead plate 250 has the same shape, size, and material as those of the second lead plate 240, and includes a bottom wall 251, a side wall 252, a fixing protrusion 253, and supports 254. Referring to FIGS. 5B and 5C, since the bottom wall 251, the side wall 252, the fixing protrusion 253, and the supports 254 of the dummy lead plate 250 correspond to the bottom wall 241, the side wall 242, the fixing protrusion 243, and the supports 244, a detailed description of the dummy lead plate 250 will be omitted.

The dummy lead plate 250 maintains the horizontality of the circuit module 220 disposed on the bare cell 110 together with the second lead plate 240. Hence, the dummy lead plate 250 can prevent lowering of the battery quality due to deflection of the circuit module that would be generated if only a second lead plate were conventionally formed on one side of the circuit module.

Referring to FIGS. 5B and 5C, the solder 260 is formed between an end of the second lead plate 240, i.e. an end of the second side wall portion 242b of the side wall 242 and the insert hole 225 to increase the coupling strength between the second lead plate 240 and the circuit module 220. Furthermore, the solder 260 is formed between an end of the dummy lead plate 250, i.e. an end of the second side wall portion 252b of the side wall 252 and the inset hole 226 to increase the coupling strength between the dummy lead plate 250 and the circuit module 220. Meanwhile, as more solder 260 is filled in the insert holes 225 and 226, the coupling strengths between the second lead plate 240 and the circuit module 220 and between the dummy lead plate 250 and the circuit module 220 increase. To achieve this, as illustrated in FIG. 3B, insert holes (not shown) whose upper portions are larger than their lower portions like the insert hole 124a illustrated in FIG. 3B may be formed in the circuit module 220 instead of the insert holes 225 and 226.

As mentioned above, in the battery pack 200 according to the embodiment of the present invention, the circuit module 220 can be physically and electrically connected to the bare cell 110 by inserting the second lead plate 240 into the insert hole 225 having the size enabling insertion of the second side wall portion 242b of the side wall 242 of the second lead plate 240.

Accordingly, the battery pack 200 according to the embodiment of the present invention can secure a wider mounting space for the circuit device 123 as compared with the case in which a second lead plate is conventionally mounted to the bottom surface of a circuit module, can simplify the assembling process of the second lead plate 240 and the circuit module 220, and can miniaturize the battery by lowering the height between the bare cell 110 and the circuit module 220.

In addition, the battery pack 200 according to the embodiment of the present invention can couple the dummy lead plate 250 to the opposite side of the circuit module 220 provided as the mounting space of the circuit device 123 is secured, so that the dummy lead plate 250 is symmetrical with the second lead plate 240.

Accordingly, the battery pack 200 according to the embodiment of the present invention can maintain the horizontality of the circuit module 220 disposed on the bare cell 110 using the second lead plate 240 and the dummy plate 250. Therefore, the battery pack 200 according to the embodiment of the present invention can prevent lowering of the battery quality due to deflection of the circuit module that would be generated if only a second lead plate was conventionally formed on one side of the circuit module.

Hereinafter, a battery pack 300 according to another embodiment of the present invention will be described in detail.

The battery pack 300 according to the embodiment of the present invention has the same structure as that of the battery pack 100 according to the first mentioned embodiment of the present invention except that a second lead plate 240 and a dummy lead plate 250 are applied instead of the second lead plate 140 and the dummy lead plate 150 of the battery pack 100.

Accordingly, the same elements are endowed with the same reference numerals and the description of the same elements will be omitted. Hereinafter, the coupling relations of the circuit module 320, the first lead plate 130, the second lead plate 240, the dummy lead plate 250, and the solder 360 will be mainly described in detail.

Figure 10A:
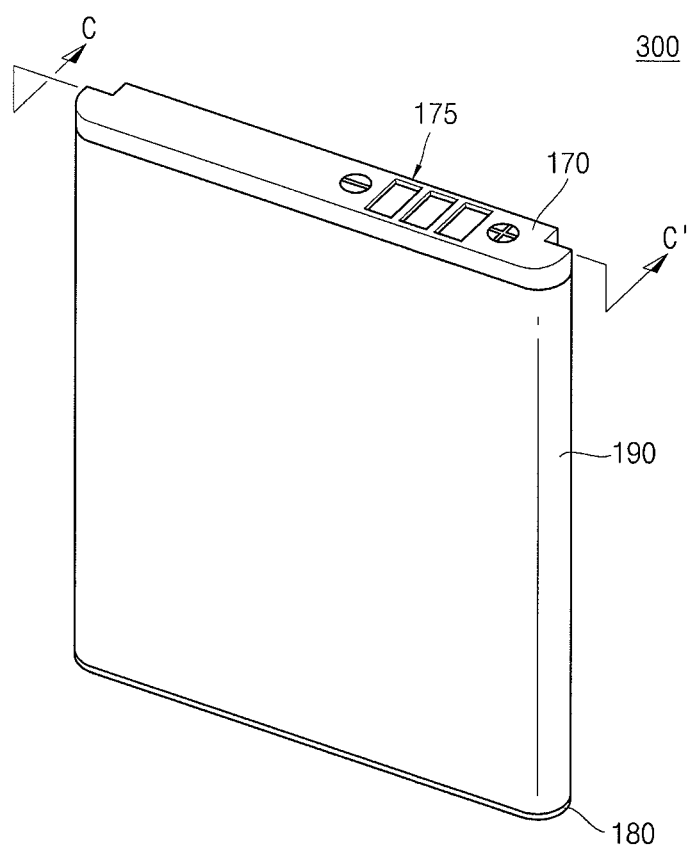
FIG. 10A is a perspective view of a battery pack according to another embodiment of the present invention.
Figure 10B:
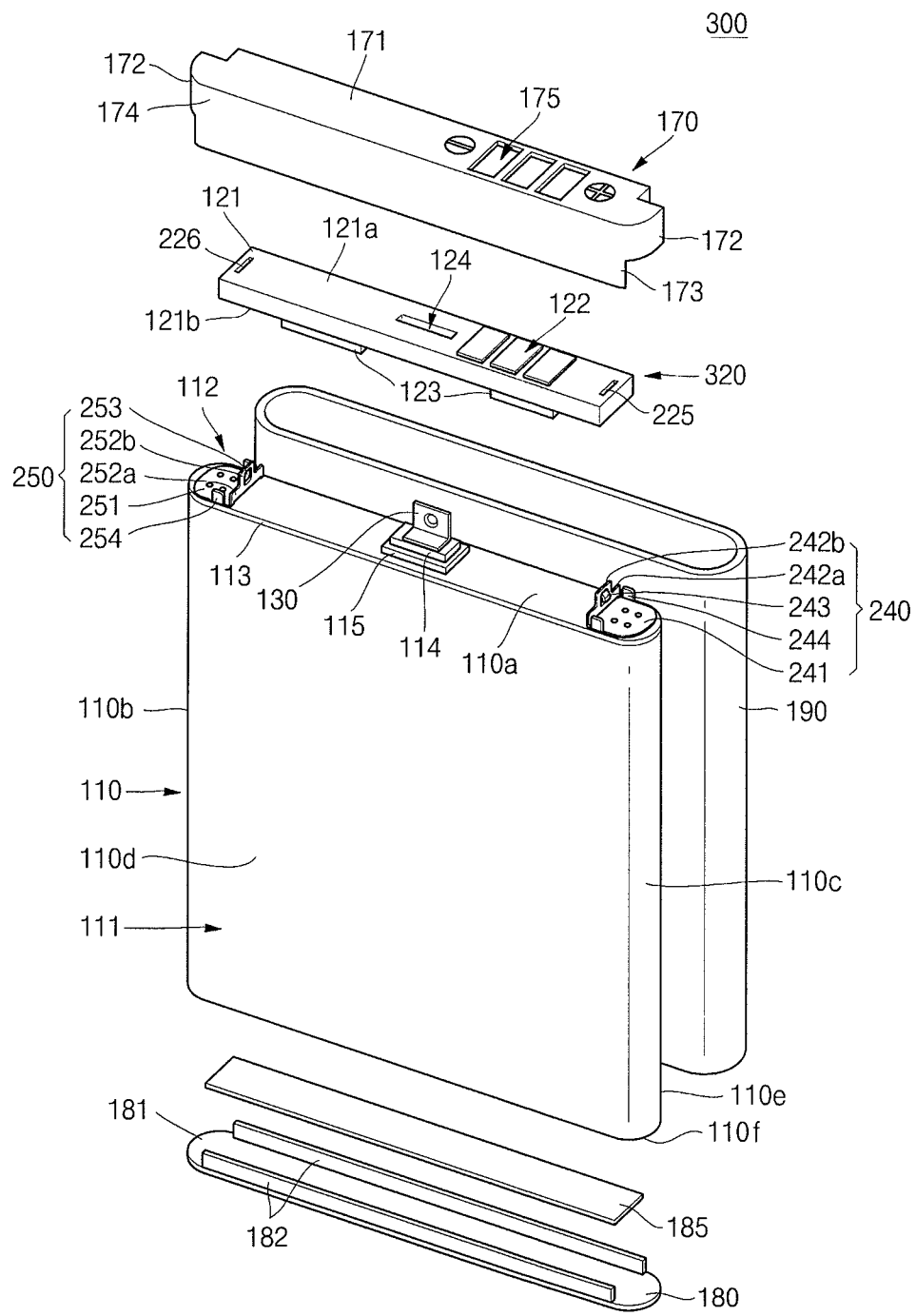
FIG. 10B is an exploded perspective view of the battery pack of FIG. 10A.
Figure 10C:
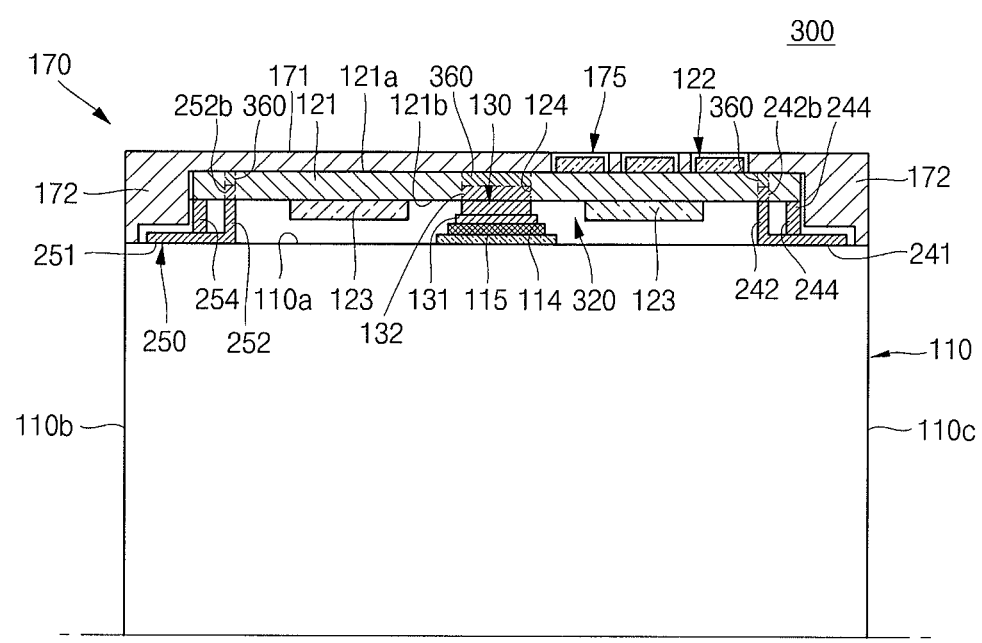
FIG. 10C is a sectional view of the battery pack of FIG. 10A taken along line C-C' of FIG. 10A.

FIG. 10A is a perspective view of a battery pack according to another embodiment of the present invention. FIG. 10B is an exploded perspective view of the battery pack of FIG. 10A. FIG. 10C is a sectional view of the battery pack of FIG. 10A taken along line C-C' of FIG. 10A.

Referring to FIGS. 10A to 10C, the battery pack 300 according to the embodiment of the present invention includes a bare cell 110, a circuit module 320, a first lead plate 130, a second lead plate 240, a dummy lead plate 250, a solder 360, a top cover 170, a bottom cover 180, and a label 190.

The circuit module 320 is disposed on the bare cell 110 and electrically connected to the bare cell 110, and includes a circuit board 121, an external terminal 122, and insert holes 124, 225, and 226.

Since the coupling relation between the circuit module 320 and the first lead plate 130 is the same as the coupling relation between the circuit module 120 and the first lead plate 130 of the battery pack 100, a detailed description thereof will be omitted.

Further, since the coupling relation between the circuit module 320 and the second lead plate 240 is the same as the coupling relation between the circuit module 220 and the second lead plate 240 of the battery pack 200, a detailed description thereof will be omitted.

Furthermore, since the coupling relation between the circuit module 320 and the dummy lead plate 250 is the same as the coupling relation between the circuit module 220 and the dummy lead plate 250 of the battery pack 200, a detailed description thereof will be omitted.

Referring to FIGS. 10B and 10C, the solder 360 is formed between an end of the first lead plate 130, i.e. an end of the side wall 132 and the insert hole 124 to increase the coupling strength between the first lead plate 130 and the circuit module 320. Further, the solder 360 is formed between an end of the second lead plate 240, i.e. an end of the second side wall portion 242b of the side wall 242 and the insert hole 225 to increase the coupling strength between the second lead plate 240 and the circuit module 320. Furthermore, the solder 360 is formed between an end of the dummy lead plate 250, i.e. an end of the second side wall portion 252b of the side wall 252 and the insert hole 226 to increase the coupling strength between the dummy lead plate 250 and the circuit module 320.

As mentioned above, the battery pack 300 according to the embodiment of the present invention can physically and electrically connect the circuit module 320 to the bare cell 110 by inserting all of the first lead plate 130, the second lead plate 240, and the dummy lead plate 250 into the insert holes 124, 225, and 226 of the circuit module 320.

Accordingly, the battery pack 300 according to the embodiment of the present invention can secure a wider mounting space for the circuit device 123 to the circuit module 320, can simplify the assembling process of the bare cell 110 and the circuit module 320 further, and can miniaturize the battery by lowering the height between the bare cell 110 and the circuit module 320, as compared with the battery packs 100 and 200.

Although the embodiments of the present invention have been described in detail hereinabove, it should be understood that many variations and modifications of the basic inventive concept herein described will still fall within the spirit and scope of the present invention as defined in the appended claims.

What is claimed is:

1. A battery pack comprising:
   a bare cell having a protruding electrode terminal insulated from the top surface thereof;
   a circuit module disposed on the bare cell and electrically connected to the bare cell, the circuit module having an insert opening formed in a region corresponding to the electrode terminal;
   a first lead plate coupled to the electrode terminal and inserted into the insert opening wherein the first lead plate includes a bottom wall having a length and a width that is positioned on the top surface of the bare cell and a side wall that extends vertically away from the top surface of the bare cell and a fixing projection that extends horizontally outward from the side wall in the width direction of the bottom wall so as to extend outward from the width of the bottom wall; and
   a second lead plate coupled to one side of the circuit module and extending to be connected to the top surface of the bare cell.

2. The battery pack of claim 1, wherein the first lead plate is made of a metal, and includes:
   the bottom wall contacted with the electrode terminal;
   the side wall bent and extended from the bottom wall and having a side wall hole, the side wall being inserted into the insert opening; and
   the fixing projection extending and protruding from one side of the inner surface of the side wall hole toward the outside of the side wall.

3. The battery pack of claim 2, wherein the insert opening comprises an insert hole and wherein the planar shape of the insert hole or the insert recess is the same as that of the side wall of the first lead plate.

4. The battery pack of claim 1, wherein the inner surface of the insert opening is plated.

5. The battery pack of claim 1, wherein the insert opening comprises an insert hole and wherein a solder interconnection is formed between an end of the first lead plate and an upper portion of the insert hole.

6. The battery pack of claim 5, wherein an upper portion of the insert hole is larger than a lower portion thereof.

7. The battery pack of claim 1, wherein the second lead plate is made of a metal, and includes:
   a bottom wall contacted with one side of the bottom surface of the circuit module;
   a side wall bent and extended from the bottom wall; and
   an extension bent and extended from the side wall to make contact with the top surface of the bare cell and parallel to the bottom wall.

8. The battery pack of claim 1, further comprising:
   a dummy lead plate coupled to the opposite side of the circuit module to be symmetrical with the second lead plate and connected to the top surface of the bare cell, the dummy lead plate having the same shape, size, and material as those of the second lead plate.

* * * * *